US006918129B2

(12) United States Patent
Sudou

(10) Patent No.: US 6,918,129 B2
(45) Date of Patent: Jul. 12, 2005

(54) DISC DRIVE HEAD DRIVER

(75) Inventor: Shinichi Sudou, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 10/424,929

(22) Filed: Apr. 29, 2003

(65) Prior Publication Data

US 2003/0218961 A1 Nov. 27, 2003

(30) Foreign Application Priority Data

May 27, 2002 (JP) ........................................ 2002-151824

(51) Int. Cl.$^7$ ................................................ G11B 7/085
(52) U.S. Cl. ...................................................... 720/664
(58) Field of Search ................................ 720/664, 661, 720/672, 607, 674–675; 369/219.1, 215.1, 244.1, 249.1, 253, 219, 215, 244, 249; 360/106, 109; 74/89.17

(56) References Cited

U.S. PATENT DOCUMENTS 5,251,195 A * 10/1993 Kawakami et al. ......... 720/608
5,307,339 A * 4/1994 Tanaka ........................ 720/664
5,777,978 A * 7/1998 Ota et al. .................... 720/693
6,250,169 B1 * 6/2001 Weisser ..................... 74/89.17

FOREIGN PATENT DOCUMENTS

| JP | 2001-23322 | | 1/2001 |
| JP | 2001-195848 | | 7/2001 |
| JP | 2002117635 | * | 4/2002 |
| JP | 2002343039 | * | 11/2002 |

* cited by examiner

Primary Examiner—Angel Castro
(74) Attorney, Agent, or Firm—Young & Thompson

(57) ABSTRACT

The present invention eliminates variations in the engagement between a rack and a pinion, which drive a recording head, to enable the head to move speedily and smoothly. A head driver includes a rack provided on a recording head that slidingly moves over a recording disc and a pinion engaged with the rack and rotated by a drive motor, wherein there are provided a concave groove, provided on the rack and running in parallel with rack tooth, and a swing arm with which a rigid guide, guided by the concave groove, is integrated and on which a rotation axis of the pinion is provided. When the rack is at a slant with the movement direction, the swing arm swings, following the slant of the rack to keep constant the spacing between the rack and the pinion.

3 Claims, 11 Drawing Sheets

DISC DRIVE HEAD DRIVER

BACKGROUND OF THE INVENTION

1. Field of the Invention

The present invention relates to a disc recording unit and more particularly to a disc drive that reads or writes information to or from a recording disc such as a CD or DVD. Still more particularly, the present invention relates to a head driver that moves the recording head over a recording disc.

2. Description of the Background Art

Recently, there is much effort being made to develop an optical disc drive as a disc recording drive. Among other things, an optical disc drive is required to write data at a high speed. A driver, which radially moves an optical head for recoding information signals on an optical disc, is also required to feed the head precisely. An optical head driver with the rack-and-pinion mechanism is proposed as an optical head driver satisfying this requirement. FIG. 11 is a front view showing the conceptual configuration of the driver. A chassis 2, has a spindle motor 4 thereon that rotates an optical disc not shown. Also provided on the chassis 2 is a pair of guide rails 3, 3 on which an optical head 1 is provided such that it can slidingly move back and forth over the optical disc in the radial direction. The optical head 1 has a rack 6 secured by a screw 7 on one side along which the optical head 1 slidingly moves. In the area on the chassis 2 opposed to a rack teeth 6A of the rack 6, a pinion 11, which engages the rack tooth 6A, a drive motor 10, and an intermediate gear 12 that rotates the pinion 11 are provided. In this configuration, an output gear 13 on the rotational output axis of the drive motor 10 is rotated. The output gear 13 rotates the pinion 11 via the intermediate gear 12. Then, because the pinion 11 and the rack 6 are engaged, the rack 6, that is, the optical head 1 slidingly moves along the rails.

This type of optical head driver has a structure in which the rack 6 is secured on the optical head 1 by engaging the boss on the rack 6 in the hole, not shown, on the optical head 1 for positioning. This implies that a size error, if introduced during hole and/or boss manufacturing, would sometimes result in the rack 6 being misaligned with the sliding direction of the optical head 1. When the optical head 1 slidingly moves along the rails in this state, the spacing between the rack 6 and the pinion 11 varies. When they are too close, the pinion 11 cannot rotate; when they are widely apart, a backlash occurs between them. This condition sometimes results in an abnormal sound being generated, the feeding load of the optical head being varied, and the optical head positioning precision being degraded, thus decreasing the reliability of the optical disc drive.

Japanese Patent Laid-Open Publication No. 2001-195848 and Japanese Patent Laid-Open Publication No. 2001-23322 have proposed technologies for proper engagement between the rack and the pinion. According to the technology disclosed in the former invention, the pinion is pressed against the rack by the spring force. On the other hand, the cylinder surface of the pinion engages the flat surface on the rack. This engagement adjusts the preload applied to the rack by the pinion through the spring force. This structure ensures the proper engagement between the pinion and the rack even if the rack installation condition varies. According to the technology disclosed in the latter invention, a motor installation board, on which the motor, intermediate gear, and pinion are installed, is pressed against the rack by the spring force. This structure enables the optical head to move back and forth under a fixed rotational load regardless of the rotational direction of the intermediate gear.

The above publications both employ a technology for pressing the pinion against the rack by the spring force to ensure proper engagement between the pinion and the rack. Therefore, even if the installation direction of the rack is misaligned with the sliding direction of the optical head, they are engaged properly. As a result, the technology solves the problems described above; that is, it prevents the pinion from not rotating properly and a backlash from being generated between the pinion and the rack. However, the spring force is always applied between the pinion and the rack. This generates a problem in the smooth movement of the optical head when it moves at a high speed.

That is, the high-speed movement of the optical head requires the optical head to be driven by a high motor torque generated by an efficient gear ratio. However, an attempt to do so exerts a force on the mating surface between the pinion and the rack, and the force prevents the pinion from properly engaging with the rack. This sometimes results in the pinion being disengaged from the rack. The technology disclosed in the above publications presses the pinion against the rack by the spring force. This is efficient for preventing the disengagement between the pinion and the rack. However, this technology requires the spring force strong enough for engaging the pinion with the rack even if the optical head is moved by the maximum output of the motor. The technology disclosed in the former publication adjusts the force applied between the gear tooth of the pinion and those of the rack. However, even in this case, the spring force ensuring the engagement between the pinion and the rack is required. On the other hand, to improve the recording characteristics of the optical head, it is required that the optical head be moved smoothly. To move the head smoothly, an excess force should not be applied to the gear tooth surface of the pinion and that of the rack. However, according to the technology disclosed in the publications described above, the spring force increases the force of engagement between the pinion and the rack. This adds an excess force to the gear tooth surface of the pinion and that of the rack. This presents a problem in high-speed, smooth movement of the optical head.

SUMMARY OF THE INVENTION

In view of the problems with a drive in the prior art, it is an object of the present invention to provide a head driver with the following features. The head driver ensures proper engagement between the rack and the pinion without applying an excess force to the gear mating-surface of the rack and the pinion. The head driver moves the recording head speedily and smoothly.

A head driver according to the present invention, which is provided on a disc drive that slidingly moves a recording head over a recording disc to write or read information to or from the recording disc, comprises a rack provided on the recording head; and a pinion engaged with the rack and rotated by a drive source, wherein axis spacing retaining means retains fixed spacing between the rotation axis of the pinion and the rack with a rigid material.

The axis spacing retaining means according to the present invention is composed of a positive motion cam mechanism. The positive motion cam mechanism is a mechanism that adds a constraint to a reciprocating follower and a cam to enable the cam to work. For example, the axis spacing retaining means has a concave groove provided on the rack and running in parallel with the rack tooth. The axis spacing retaining means also has a swing arm that swings with a rigid guide integrated therewith, wherein the guide is guided by the concave groove. The axis spacing retaining means has the rotation axis of a pinion on a part of the swing arm. In this case, the swing arm is able to swing around the rotation axis of the drive side gear that rotates the pinion. For example, the drive side gear comprises a drive motor driving the pinion; an output gear provided on the rotation output axis of the drive motor; and an intermediate gear transmitting the rotation force of the output gear to the pinion. The swing arm is able to swing around the rotation axis of the intermediate gear.

The head driver according to the present invention operates as follows when the rack extension direction is at a slant with the head movement direction. When the recording head moves, the swing arm that acts as the axis spacing retaining means swings, following the slant of the rack. Then, the rotation axis of the pinion supported by the swing arm moves. Therefore, the spacing between the rack and rotation axis of the pinion is kept constant. On the other hand, because the axis spacing retaining means is made of rigid material, there is no need for one of the pinion and the rack to be pressed against the other by the spring force. Therefore, no excess power is applied to the gear-mating surface of the rack and the pinion. This ensures proper engagement between the rack and the pinion. The recording head can move speedily and smoothly.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

DESCRIPTION OF THE PREFERRED EMBODIMENTS

Figure 1:
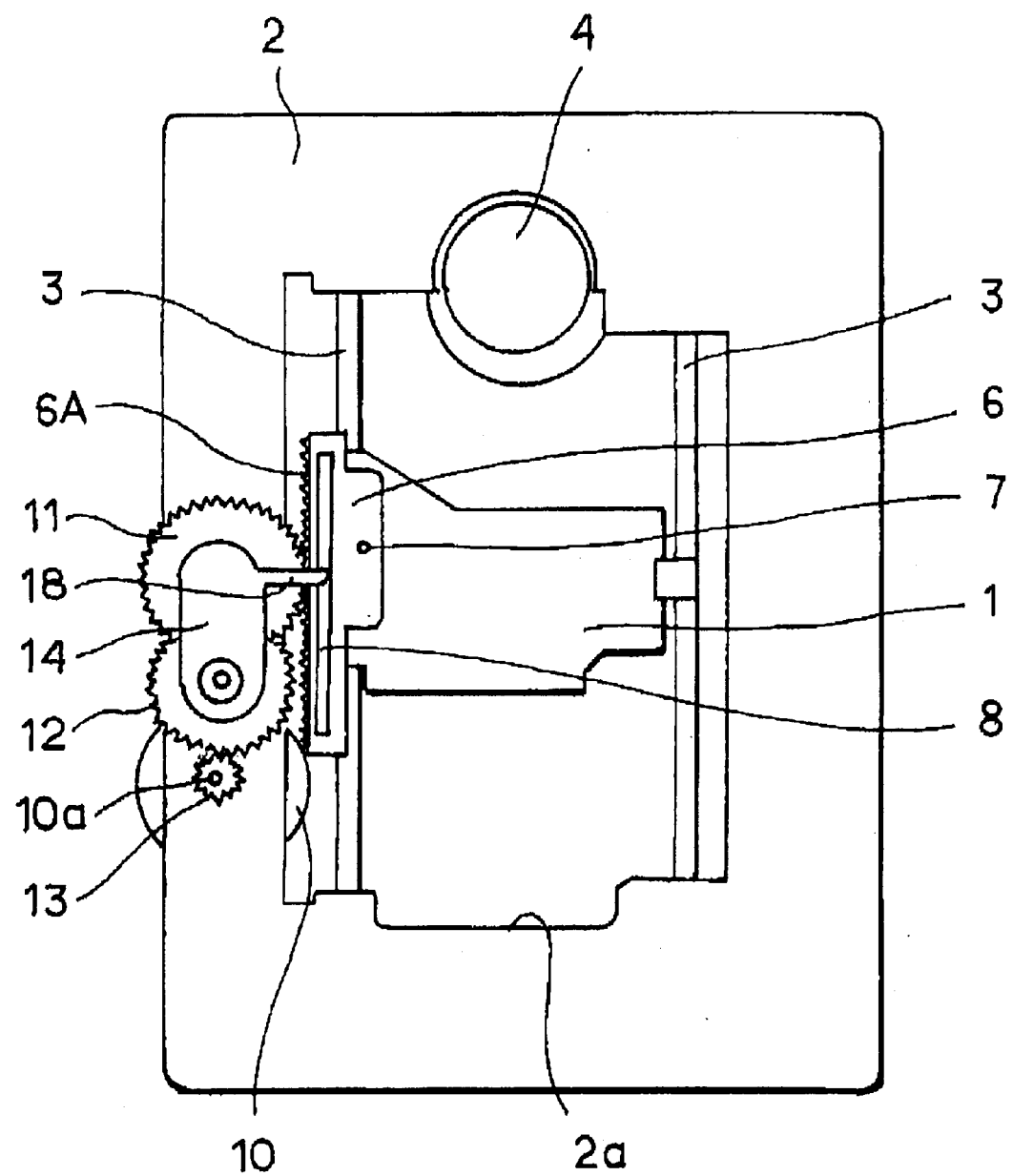
FIG. 1 is a front view of an optical head driver according to the present invention.
Figure 2:
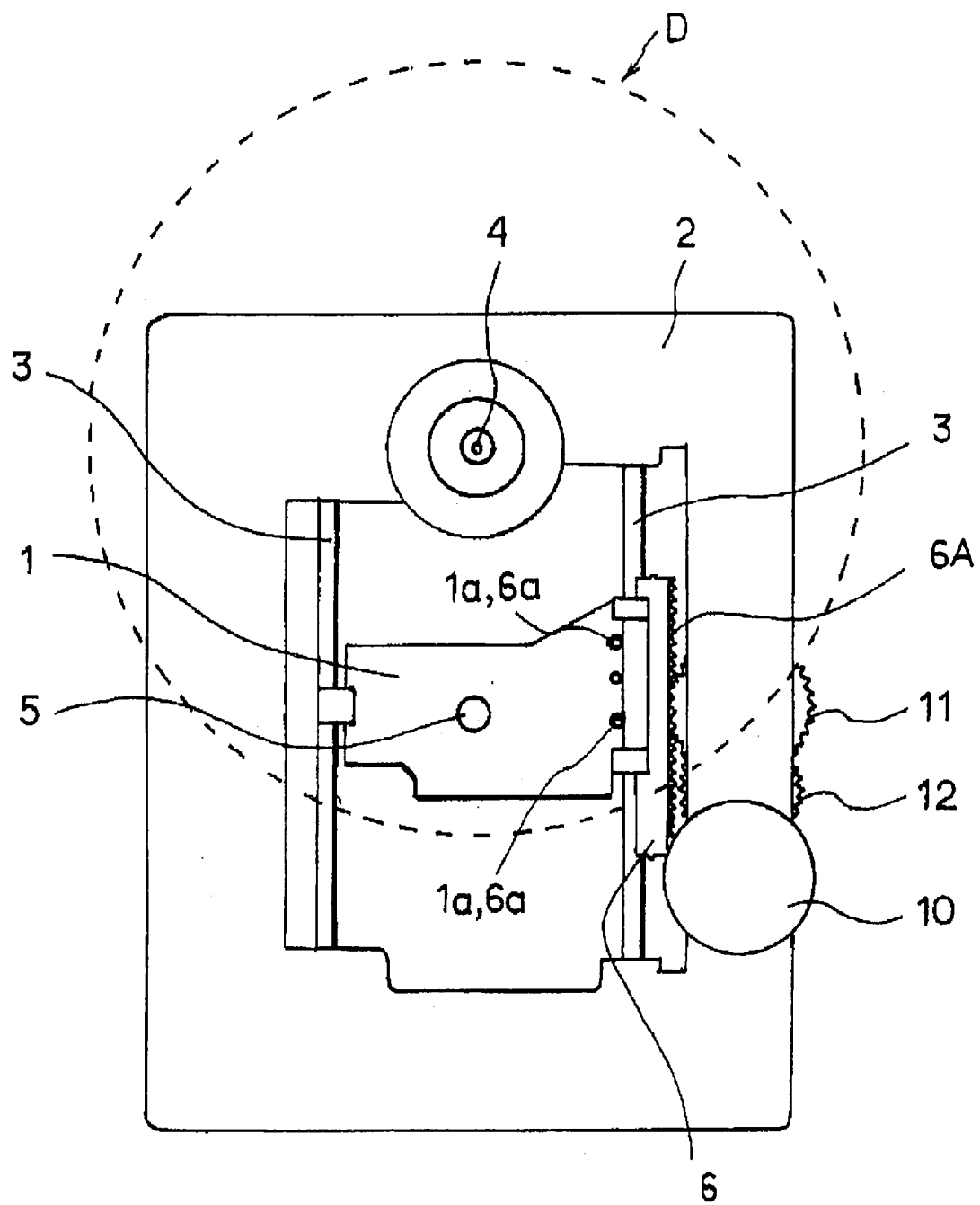
FIG. 2 is a rear view of the optical head driver shown in FIG. 1.
Figure 3:
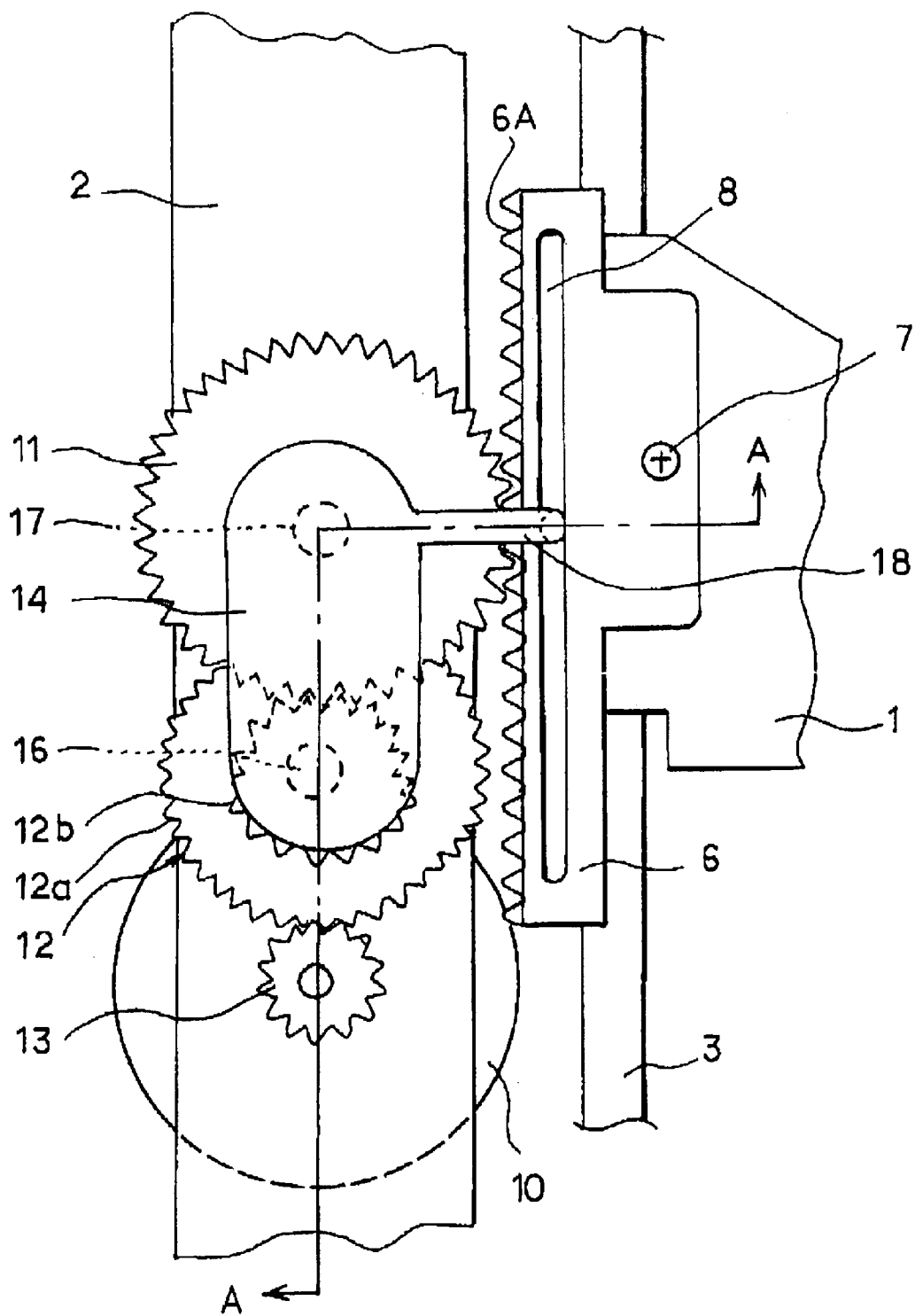
FIG. 3 is an enlarged front view of the major components.
Figure 4:
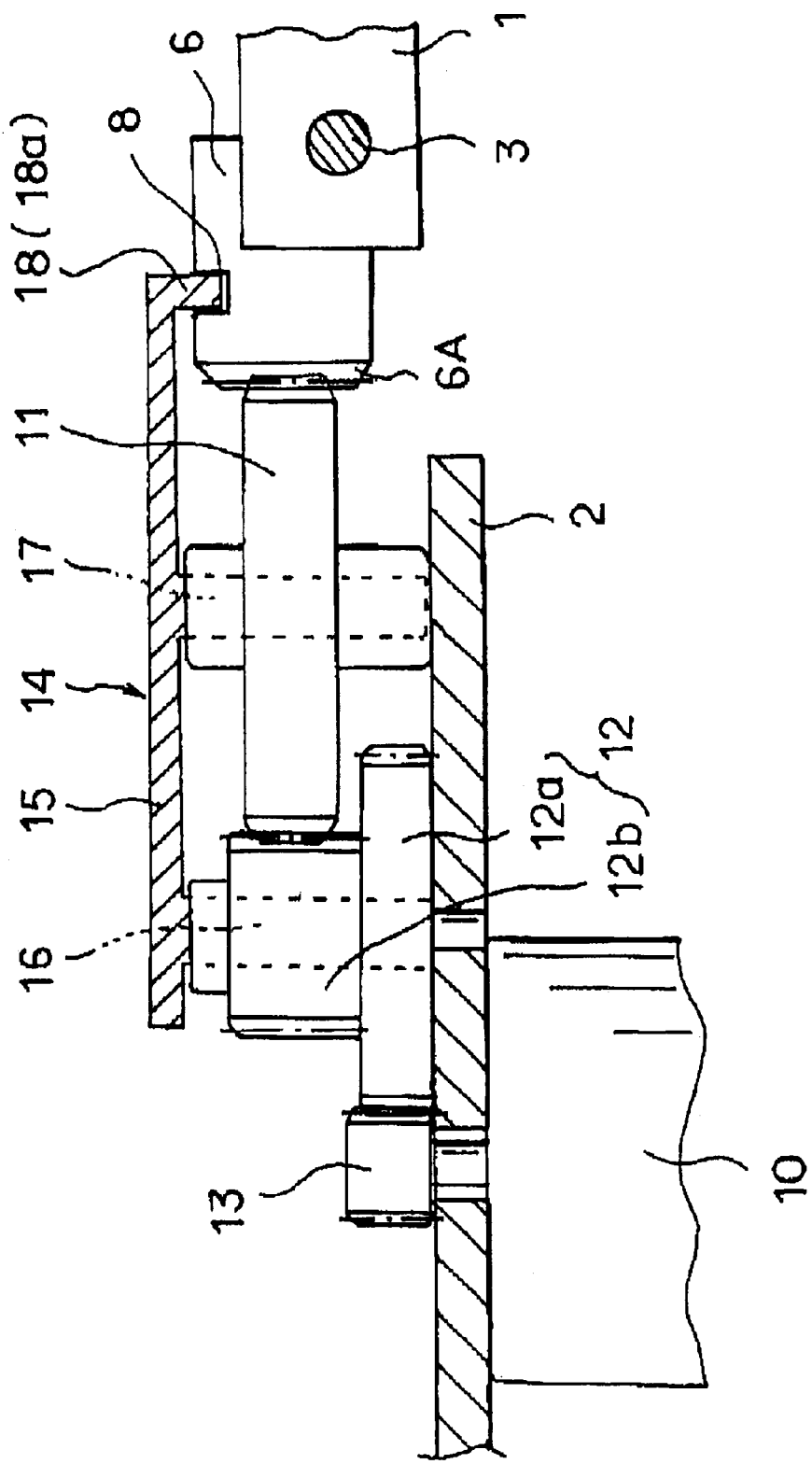
FIG. 4 is a cross section view taken on line AA in FIG. 3.

Next, an embodiment of the present invention will be described with reference to the drawings. FIG. 1 is a front view of an optical head driver in an embodiment in which the present invention is applied to an optical disc drive, and FIG. 2 is a rear view of the optical head driver. FIG. 3 is an enlarged front view of the major components, and FIG. 4 is a cross section view taken on line AA in FIG. 3. Referring to those figures, a chassis 2 that looks like a rectangular board has a head movement window 2a. In this head movement window 2a is provided a pair of parallel guide rails 3, 3 supported by the chassis 2. An optical head 1 is slidably supported on the guide rails 3, 3. Also provided on the chassis 2 is a spindle motor 4. This motor rotates an optical disc D, indicated by a dotted line in the figure, at a high speed. The guide rails 3, 3 extend over an optical disc D in its radial direction. Therefore, the optical head 1 is slidably supported such that it moves back and forth along the guide rails 3, 3 in the radial direction of the optical disc D. An objective lens 5 is provided on the back of the optical head 1. The optical head is structured in such a way that optical means is built in the optical head 1 to write and read information to and from the optical disc D. The detailed description is omitted here.

A rack 6 is installed on one side along which the optical head 1 slidingly moves. As in the conventional optical head, the rack 6 has a pair of holes 1a, spaced at a predetermined interval, on the optical head 1 in parallel with the guide rails 3, 3. The rack 6 is positioned by engaging a pair of bosses 6a, provided in the positions corresponding to the holes 1a, into the holes 1a. After that, the rack 6 is fastened on the optical head 1 by the setscrew 7 from the front side of the optical head 1. The rack 6 has rack tooth 6A on the straight side that is opposite to the optical head. The rack tooth 6A are engaged with a pinion that will be described later. On the front of the rack 6, a straight concave groove 8 extended in parallel with the rack tooth 6A is formed.

Figure 5:
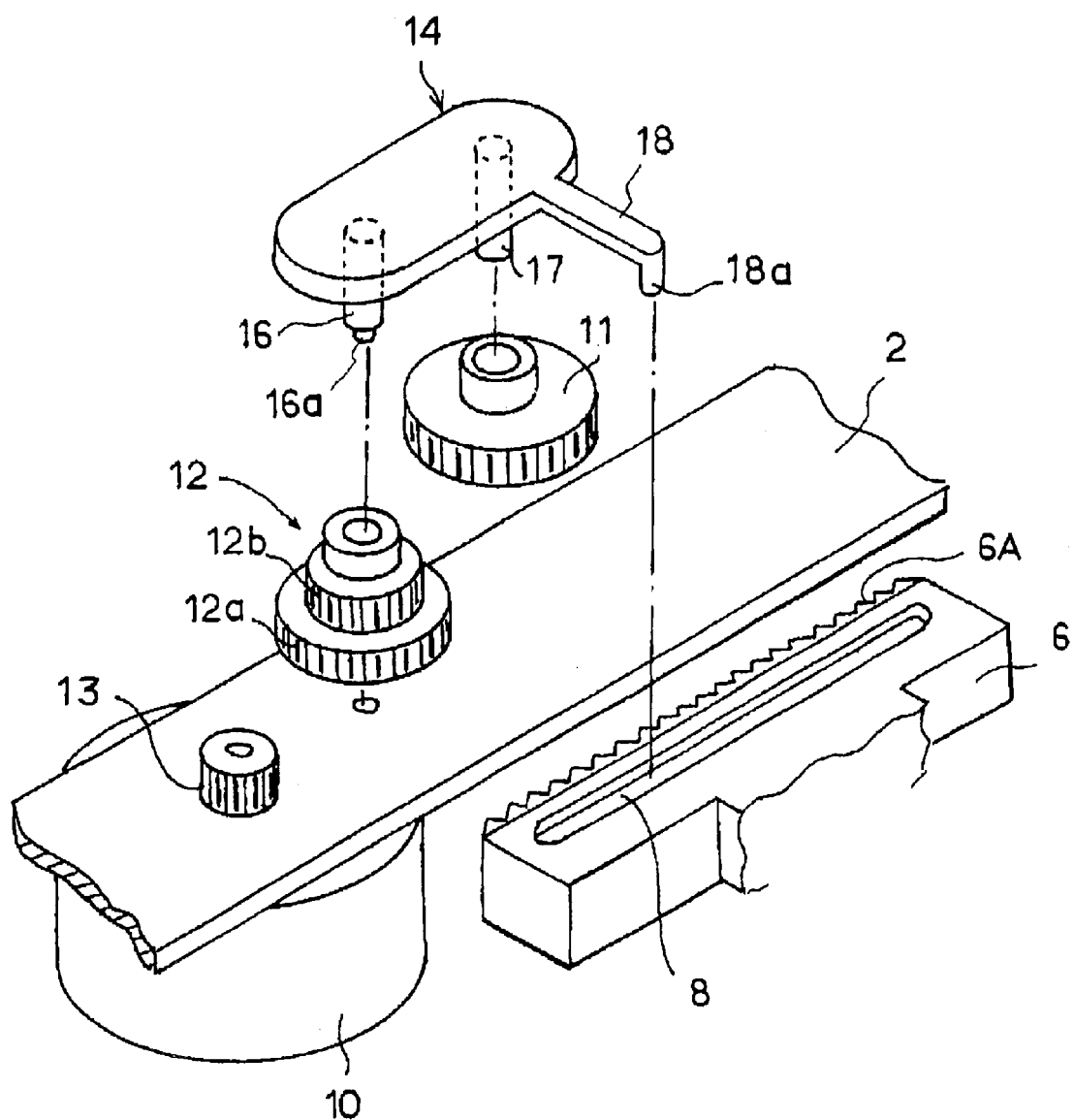
FIG. 5 is a partially exploded perspective view of the major components including a pinion.

FIG. 5 is a partially exploded perspective view of the major components. A pinion 11, which engages the rack tooth 6A of the rack 6, is provided in an area that is on the back of the chassis 2 and is opposed to the rack tooth 6A on the rack 6. A drive motor 10 is provided to rotate the pinion 11. An intermediate gear 12 is provided. The intermediate gear 12 is composed of a first gear 12a and a second gear 12b that transmit the turning force of the drive motor 10 to the pinion 11. In this embodiment, the drive motor 10 is installed on the front side of the chassis 2. An output gear 13 is fixed on a rotation output axis 10a protruded from the back of the chassis 2. Also provided on the back of the chassis 2 is a swing arm 14 located next to the rotation output axis 10a so that it can swing within a predetermined angle above the surface of the chassis.

Figure 6:
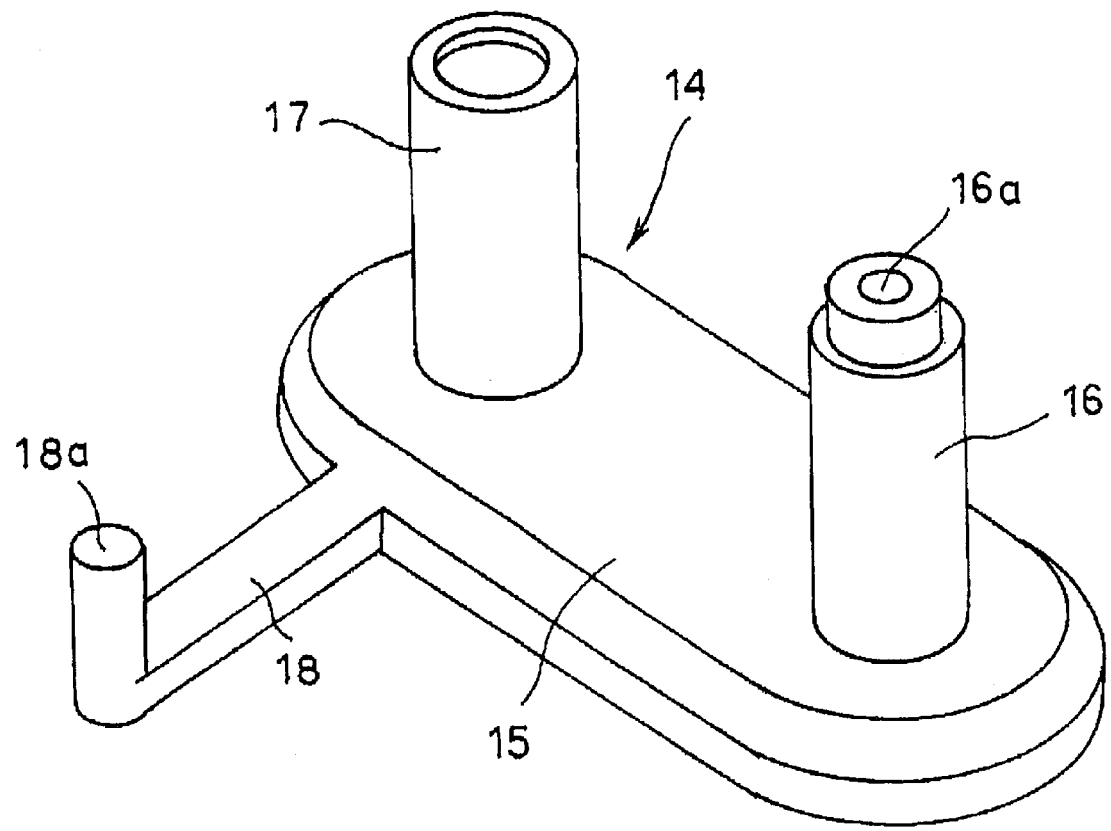
FIG. 6 is a perspective view of the rear of a swing arm.

The swing arm 14 constitutes axis spacing retaining means according to the present invention. FIG. 6 shows a perspective view from the front side. The swing arm 14 is made of rigid material. The swing arm 14 has an intermediate gear axis 16, which has a small-diameter end 16a, at one end of an oval swing plate 15. A pinion axis 17 is at the other end. A guide 18 protrudes from the side of the swing plate 15 next to the pinion axis 17. The guide 18 is in L shape with its end 18a bent 90 degrees towards the back. This end 18a is column-shaped. The diameter of this column is slightly smaller than the width of the concave groove 8 on the rack 6. As shown in FIG. 3, the swing arm 14 is rotatably supported by the small-diameter end 16a of the intermediate gear axis 16. That is, the swing arm 14 is rotatably supported on the chassis 2 at the end 16a in the axial direction. At the same time, the intermediate gear 12 is rotatably supported by the intermediate gear axis 16. The pinion axis 17 is rotatable on the front side of the chassis 2. The pinion 11, which engages the intermediate gear 12, is rotatably supported by the pinion axis 17. The large-diameter first gear 12a of the intermediate gear 12 engages the output gear 13 of the drive motor 10. The small-diameter second gear 12b engages the pinion 11. The swing arm 14 has the end 18a of the guide 18. The end 18a engages in the concave groove 8 provided on the front of the rack 6. With the swing arm 14 in this state, the pinion 11 engages the rack tooth 6A of the rack 6.

When the drive motor 10 is rotated and then the output gear 13 is rotated in the optical disc drive with the configuration described above as in the conventional drive, the turning force is transmitted to the first gear 12a of the intermediate gear 12. Then, the second gear 12b coupled with the first gear 12a is rotated. In addition, the pinion 11 engaging the second gear 12b is rotated. Therefore, the rack 6, which engages the pinion 11, moves in relation to the pinion 11. Therefore, the optical head 1 coupled with the rack 6 moves along the guide rails 3. This enables optical means in the optical head 1 to write and read information to and from the optical disc D.

Figure 7:
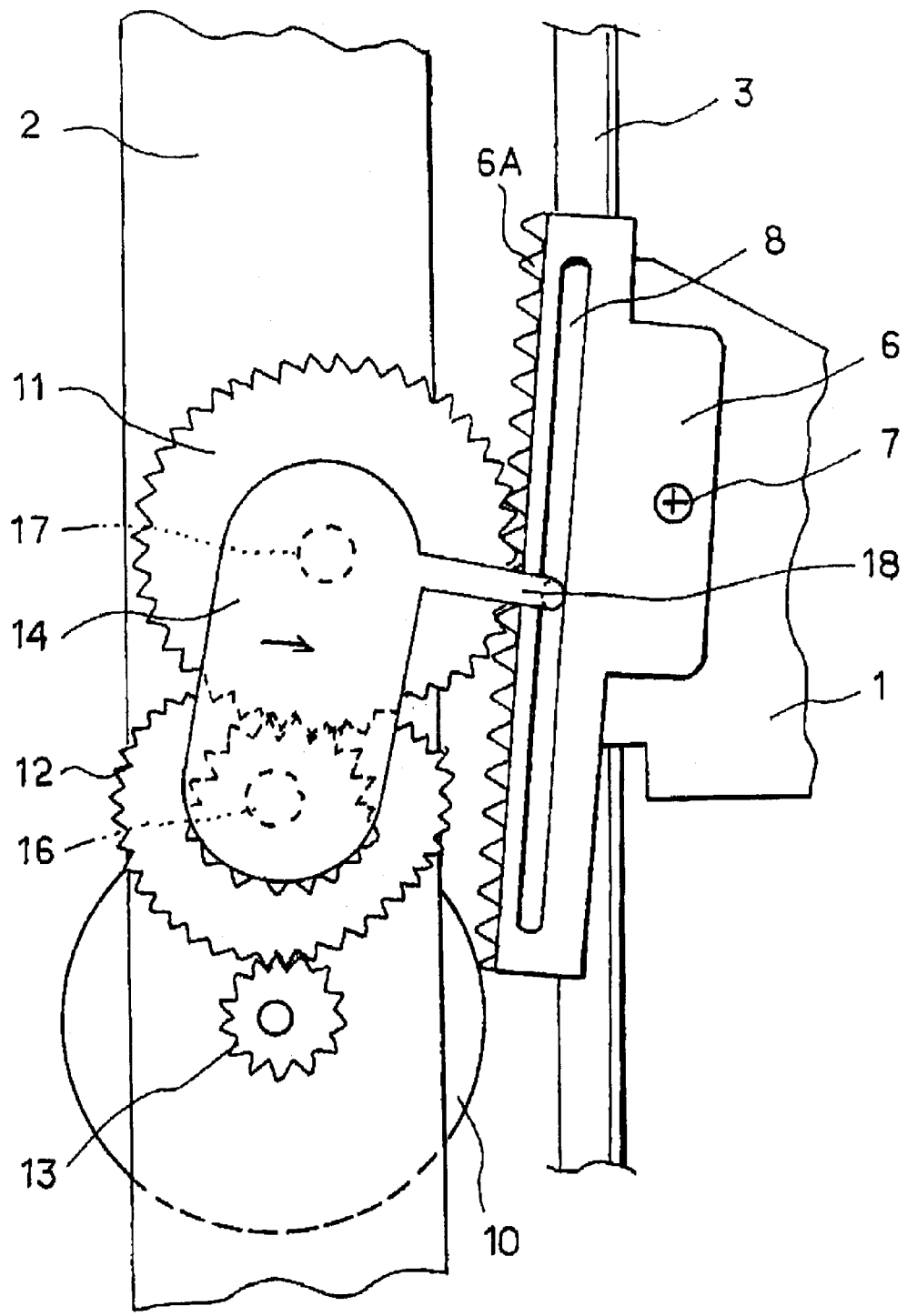
FIG. 7 is an enlarged front view of the major components including the pinion for illustrating the operation of the driver according to the present invention.

At this time, the direction of the rack 6 on the optical head 1 is sometimes at a slant with the extension direction of the guide rail 3 as shown in FIG. 7. That is, the extension direction of the rack tooth 6A is at a slant with the extension direction of the guide rail 3. For example, there is sometimes a size discrepancy between the hole 1a, on the optical head 1 and the boss 6a on the rack 6. In this case, the rack 6 may not be installed in the correct direction with respect to the optical disc D. In such a case, when the optical head 1 moves along the guide rail 3, the position of the rack tooth 6A relative to the pinion 11 varies. However, as the rack 6 moves, the end 18a of the guide 18 on the swing arm 14, guided by the concave groove 8, slides in the concave groove 8. Thus, the concave groove 8 and the swing arm 14 constitute a positive motion cam mechanism. This positive motion cam mechanism causes the swing arm 14 to move along the concave groove 8 around the intermediate gear axis 16. This swing motion causes the pinion axis 17 to rotate only within a small angle around the intermediate gear axis 16. This keeps the constant distance, that is, the spacing, between the pinion and the rack 6 and therefore allows the pinion 11 to properly engage the rack tooth 6A. At this time, the pinion 11 also engages the second gear 12b of the intermediate gear 12 properly.

This structure ensures the proper engagement between the rack tooth 6A and the pinion 11 even when the optical head moves with the rack 6 at a slant. On the other hand, the swing arm 14 made of rigid material retains the axis position of the pinion 11 with respect to the rack 6. This eliminates the need for one of the pinion and the rack to be pressed against the other by the spring force as in the conventional structure. Nor is an excess force applied to the gear-mating surface of the rack 6 and the pinion 11. Therefore, this structure always provides the proper engagement between the rack 6 and the pinion 11. This structure allows the optical head 1 to move speedily and smoothly.

Figure 8:
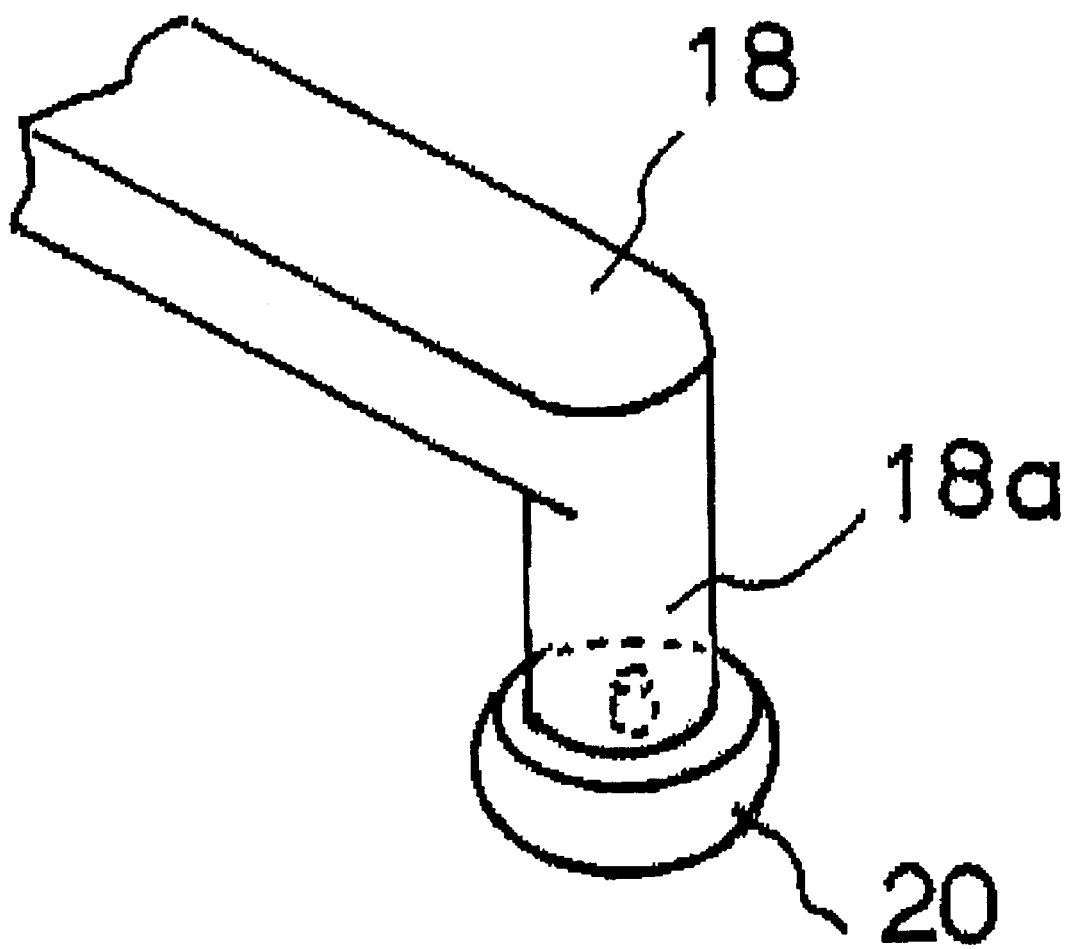
FIG. 8 is a perspective view of the major components in a first modification.

Some modifications of the present invention will be described. FIG. 8 is a perspective view of a first modification in which a rotatable roller 20 is provided at the end 18a of the guide to minimize the friction between the external surface of the end 18a and the internal surface of the concave groove 8 when the end 18a of the guide 18 slides in the concave groove 8. This roller 20 rotates in the concave groove 8 to bring the guide 18 into a rolling contact with the concave groove 8. A minimized friction between them enables the optical head 1 to move faster and more smoothly.

Figure 9A:
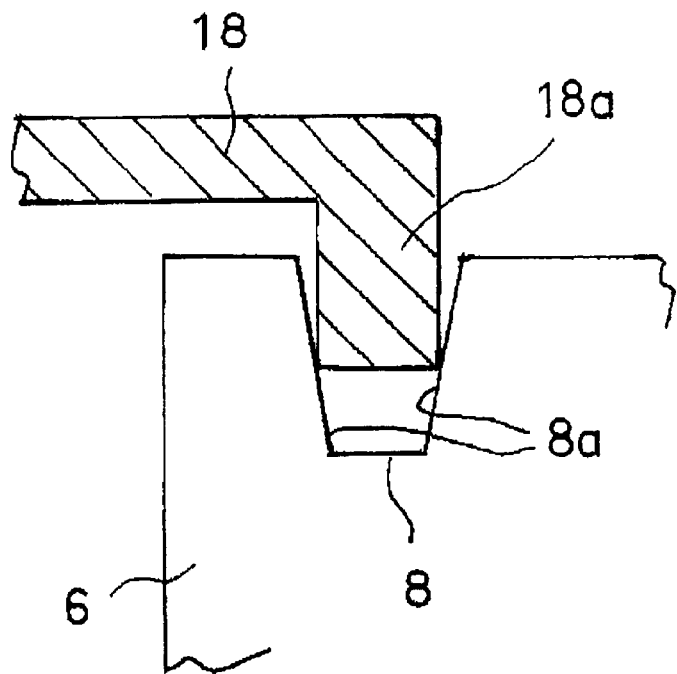
FIGS. 9A and 9B are cross section views of the major components in a second modification.
Figure 9B:
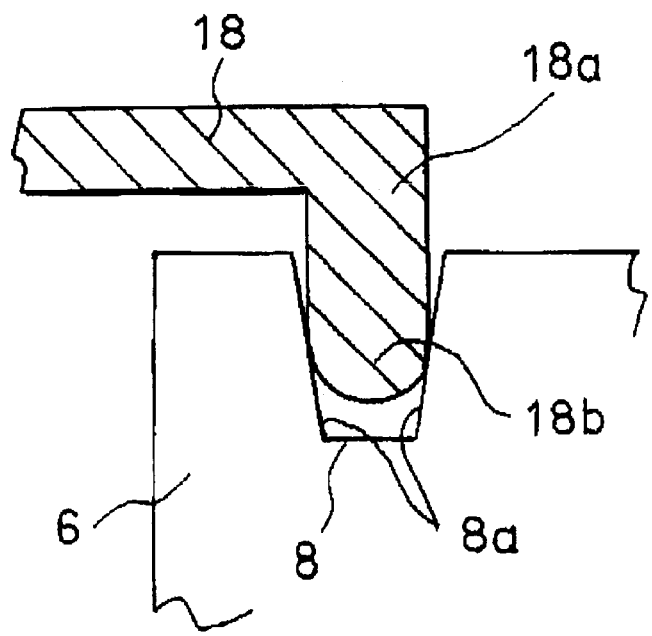

FIG. 9 is a cross section of a second modification in which both sides 8a of the concave groove 8 are tapered. As shown in FIG. 9A, the both sides 8a of the concave groove 8 are tapered towards the bottom. This allows the end 18a of the guide 18 to contact the both sides 8a of the concave groove 8. This structure eliminates a shake caused by a dimension discrepancy between the guide 18 and the concave groove 8. In addition, the swing arm 14 can swing stably. The taper angles of the both sides 8a should be symmetrical. The symmetrical angles make it possible to always align the center of the concave groove 8 with the center of the end 18a of the guide 18. Proper alignment keeps the spacing between the pinion 11 and the rack 6 highly accurate. The end 18a of the guide 18 may be a spherical end 18b such as the one shown in FIG. 9B.

Figure 10:
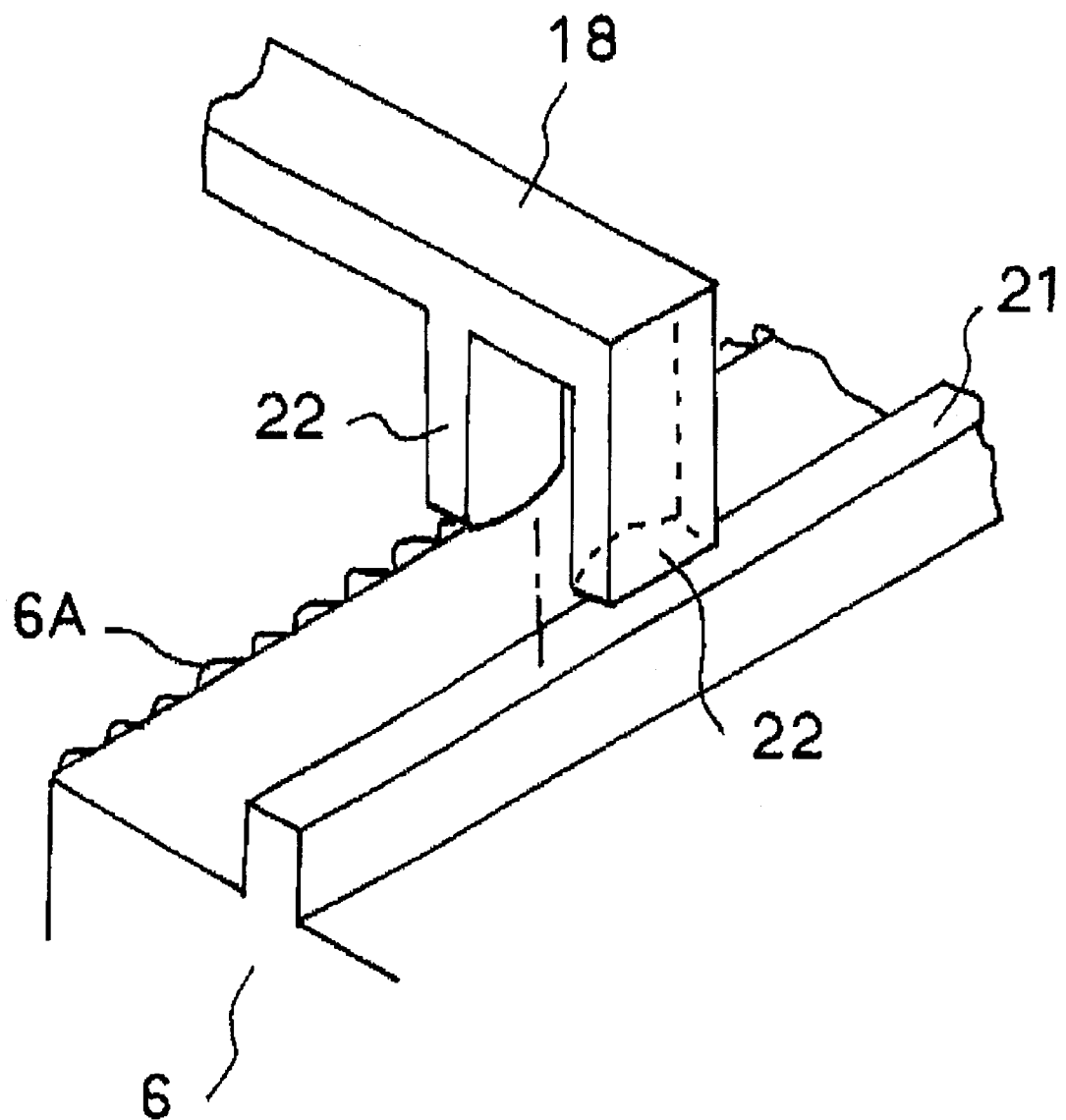
FIG. 10 is a perspective view of the major components in a third modification.
Figure 11:
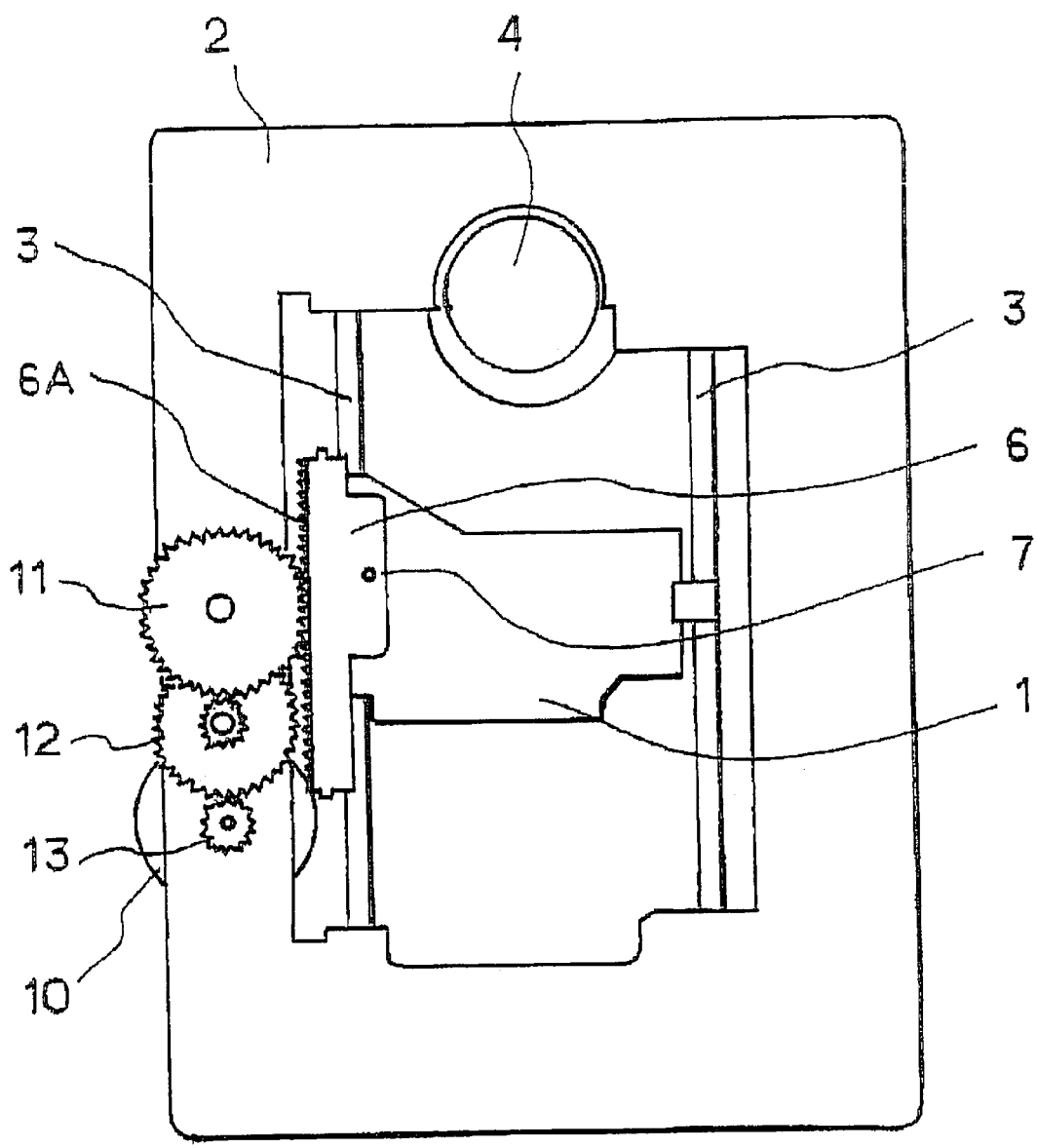
FIG. 11 is a front view of an example of an optical head driver in the prior art.

FIG. 10 is a perspective view of a third modification. Instead of the concave groove 8, a long projection 21 is provided on the front of the rack 6 as a modification of the positive motion cam mechanism. On the other hand, the swing arm 14 has a forked end 22 at the end of the guide 18 to hold the long projection 21 at its both sides. In this embodiment, when the direction of the rack 6 is at a slant with the guide rail 3, the forked end 22 moves while holding the long projection 21. The movement swings the swing arm 14. This structure keeps constant the spacing between the rack 6 and the pinion 11. The long projection 21 may also be manufactured separately from the rack 6 and fixed on the rack 6. This method eliminates the need for the concave groove 8 to be provided on the rack 6 as in the above embodiment and modifications. In this case, the present invention may be applied to an existing rack without any change. To reduce the contact resistance between the long projection 21 and the forked end 22, the inner surface of the forked end 22 should preferably be circular.

It is to be understood that the present invention is not limited the optical head driver of an optical disc drive but that it may be applied also to the head driver of a magnetic head for use with a magnetic disk.

As described above, the optical head driver according to the present invention has a rack on a recording head that slidingly moves over a recording disc. The optical head driver according to the present invention comprises axis spacing retaining means. The axis spacing retaining means, made of rigid material, keeps constant the spacing between the rack and the rotation axis of the pinion that engages the rack and that is driven by the drive source. Thus, even when the recording head moves with the rack extension direction at a slant with the head movement direction, the swing arm that acts as the axis spacing retaining means swings, following the slant of the rack. As a result, the spacing between the rack and rotation axis of the pinion is kept constant. In addition, because the axis spacing retaining means is made of rigid material, there is no need for one of the pinion and the rack to be pressed against the other by the spring force. Therefore, no excess power is applied to the gear-mating surface of the rack and the pinion. Proper engagement between the rack and the pinion may be achieved in this way. The present invention therefore provides a head driver that ensures the speedy and smooth movement of the recording head.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A head driver provided on a disc drive, wherein said head driver slidingly moves a recording head over a recording disc to write or read information to or from the recording disc, wherein said head driver comprises:

a rack provided on said recording head;

a pinion engaged with said rack and rotated by a drive source; and axis spacing retaining means for retaining fixed spacing between a rotation axis of said pinion and said rack with a rigid material, wherein said axis spacing retaining means is composed of a positive motion cam mechanism, and wherein said axis spacing retaining means comprises:

a concave groove provided on said rack and extending in parallel with rack tooth; and a swing arm that swings with a rigid guide integrated therewith, said guide being guided by said concave groove, wherein said swing arm includes the rotation axis of said pinion.

2. The head driver of a disc drive according to claim 1, wherein said swing arm is able to swing around a rotation axis of a drive gear rotating said pinion.

3. The head driver of a disc drive according to claim 2, further comprising:

a drive motor driving said pinion;

an output gear provided on a rotation output axis of said drive motor; and an intermediate gear transmitting a rotation force of said output gear to said pinion, wherein said swing arm is able to swing around a rotation axis of said intermediate gear.

* * * * *